US008290943B2

(12) United States Patent
Carbone et al.

(10) Patent No.: US 8,290,943 B2

(45) Date of Patent: Oct. 16, 2012

(54) GEOGRAPHICAL INFORMATION DISPLAY SYSTEM AND METHOD

(75) Inventors: John N. Carbone, Garland, TX (US); Christopher E. Kline, Bellefonte, PA (US); Kevin L. Johnson, Mill Hall, PA (US); Kenneth J. Magnes, State College, PA (US); Ashley C. Mort, State College, PA (US)

(73) Assignee: Raytheon Company, Waltham, MA (US)

( * ) Notice: Subject to any disclaimer, the term of this patent is extended or adjusted under 35 U.S.C. 154(b) by 1013 days.

(21) Appl. No.: 11/773,260

(22) Filed: Jul. 3, 2007

(65) Prior Publication Data

US 2008/0077642 A1 Mar. 27, 2008

Related U.S. Application Data

(60) Provisional application No. 60/831,093, filed on Jul. 14, 2006.

(51) Int. Cl.
*G06F 7/00* (2006.01)
*G06F 17/30* (2006.01)

(52) U.S. Cl. ........................................................ 707/724

(58) Field of Classification Search ................... 707/724
See application file for complete search history.

(56) References Cited

U.S. PATENT DOCUMENTS

| | | | | |
|---|---|---|---|---|
| 5,848,373 | A * | 12/1998 | DeLorme et al. | 701/200 |
| 6,654,800 | B1 * | 11/2003 | Rieger, III | 709/223 |
| 7,599,988 | B2 * | 10/2009 | Frank | 709/203 |
| 2002/0143469 | A1 | 10/2002 | Alexander et al. | 702/2 |
| 2002/0145620 | A1 | 10/2002 | Smith et al. | 345/712 |
| 2003/0063094 | A1 | 4/2003 | Smith | 345/581 |
| 2004/0078750 | A1 | 4/2004 | Frank | 715/500 |
| 2005/0270311 | A1 | 12/2005 | Rasmussen et al. | 345/677 |
| 2006/0139375 | A1 | 6/2006 | Rasmussen et al. | 345/641 |
| 2007/0100802 | A1 * | 5/2007 | Celik | 707/3 |
| 2008/0077642 | A1 | 3/2008 | Carbone | |

FOREIGN PATENT DOCUMENTS

| | | |
|---|---|---|
| AU | 2007272623 B2 | 7/2012 |
| JP | 2002157253 A | 5/2002 |
| JP | 2003131565 A | 5/2003 |
| WO | WO-2008008724 A2 | 1/2008 |

OTHER PUBLICATIONS

PCT International Search Report and Written Opinion (ISA/EP) for PCT/US2007/073041; 11 pages, Feb. 4, 2008.
U.S. Appl. No. 11/672,460, entitled "System and Method for Providing Remote Access to Events from a Database Access System," (32 pages), Feb. 7, 2006.

(Continued)

*Primary Examiner* — Greta Robinson
*Assistant Examiner* — Jeffrey Chang
(74) *Attorney, Agent, or Firm* — Schwegman Lundberg & Woessner, P.A.

(57) ABSTRACT

In one embodiment, a geographical information system has an information database and a client computing system that is coupled to a web server. A web based application is operable to display a map that includes a particular geographical location, retrieve at least one of a plurality of data records from the metadata database, and display the at least one data record at the particular geographical location of the map for a user. The web based application is executable on the client computing system or on the web server using a web browser.

20 Claims, 10 Drawing Sheets

OTHER PUBLICATIONS

Daughtery et al., U.S. Appl. No. 12/428,702, entitled "Method and System for Automating Data Queries During Discontinuous Communications," filed Apr. 23, 2009, 30 pages.
*Intellectual Property Office; Examination Report* for Application No. GB0901323.6; 4 pages, Nov. 9, 2010.
*Intellectual Property Office; Examination Report Under Section* 18(3) for Application No. GB0901323.6; 3 pages, Jul. 12, 2011.
*Australian Government; Examiner's First Report* for Application No. 2007272623; 2 pages, Jun. 14, 2011.
"Australian Application No. 2007272623, Office Action mailed Jun. 14, 2011", 2 pgs.
"Australian Application No. 2007272623, Response filed Feb. 24, 2012 to Office Action mailed Jan. 4, 2012", 4 pgs.
"Australian Application No. 2007272623, Response filed Dec. 1, 2011 to Office Action mailed Jun. 14, 2011", 17 pgs.
"Australian Application No. 2007272623, Subsequent Examiner Report mailed Jan. 4, 2012", 2 pgs.
"Great Britain Application No. GB0901323.6, Examination Report mailed Nov. 9, 2010", 4 pgs.
"International Application No. PCT/US2007/073041, International Preliminary Report on Patentability mailed Jan. 4, 2009", 6 pgs.
"International Application No. PCT/US2007/073041, International Search Report mailed Feb. 4, 2008", 2 pgs.
"Israeli Application No. 196450, Office Action mailed Jul. 19, 2012", 16 pgs.
"Japanese Application No. 2009-519617, Office Action mailed Apr. 24, 2012", With English Translation, 19 pgs.
"Japanese Application No. 2009-519617, Response filed Jul. 23, 2012 to Office Action mailed Apr. 24, 2012", 6 pgs.
Minoura, Toshimi, et al., "WebGD: A Framework for Web-Based GIS/Database Applications", AutoCarto Proceedings Papers 2006, (2006), 1-11.

* cited by examiner

GEOGRAPHICAL INFORMATION DISPLAY SYSTEM AND METHOD

RELATED APPLICATIONS

This application claims priority under 35 U.S.C. §119(e) of U.S. Provisional Application Ser. No. 60/831,093, entitled "MULTI-INT VISUALIZATION MIVIZ," filed Jul. 14, 2006.

GOVERNMENT CONTRACT

This invention was made in part with United States Government support under Contract No. F19628-03-D-0015. The United States Government may have certain rights in this invention.

TECHNICAL FIELD OF THE INVENTION

This invention generally relates to information systems, and more particularly, to a geographical information display system and method of operating the same.

BACKGROUND OF THE INVENTION

A geographical information system (GIS) is a type of computer executable system that enables the correlation and analysis of data based upon geo-spatially related criteria. A typical geographical information system in use today may include a window portion that is adapted for the display of a geographical map. Other forms of data may be overlaid on this map at their respective geographical locations in order to provide for efficient analysis of this data based upon its relative location on the map.

SUMMARY OF THE INVENTION

In one embodiment, a geographical information system has an information database and a client computing system that is coupled to a web server. A web based application is operable to display a map that includes a particular geographical location, retrieve at least one of a plurality of data records from the metadata database, and display the at least one data record at the particular geographical location of the map for a user. The web based application is executable on the client computing system or on the web server using a conventional web browser.

In another embodiment, a computer implemented method comprises executing a web based application on a client computing system or on a web server using a conventional web browser. The web based application performing the action of displaying a geographical map on a display of the client computing system, transmitting a data record from an information database, and displaying the data record at the particular geographical location on the map for a user.

Depending on the specific features implemented, particular embodiments of the present invention may exhibit some, none, or all of the following technical advantages. Various embodiments of the present invention may be capable of providing a geographical information system that is executable using a conventional web browser. Using the existing functionality of the web browser provides several salient advantages. For example, the web browser may function as a thin client such that the core functionality of the graphical information system may be maintained in the web server. Thus, periodic upgrades may be made to the graphical information system of the present invention with relatively little effect upon client devices used by the system. Additionally, implementation of a graphical information system of the present invention allows the usage of commercial off the shelf systems (COTS), such as conventional web browsers. Other technical advantages will be readily apparent to one skilled in the art from the following figures, description and claims.

BRIEF DESCRIPTION OF THE DRAWINGS

A more complete understanding of embodiments of the invention will be apparent from the detailed description taken in conjunction with the accompanying drawings in which.

DETAILED DESCRIPTION OF EXAMPLE EMBODIMENTS OF THE INVENTION

Figure 1:
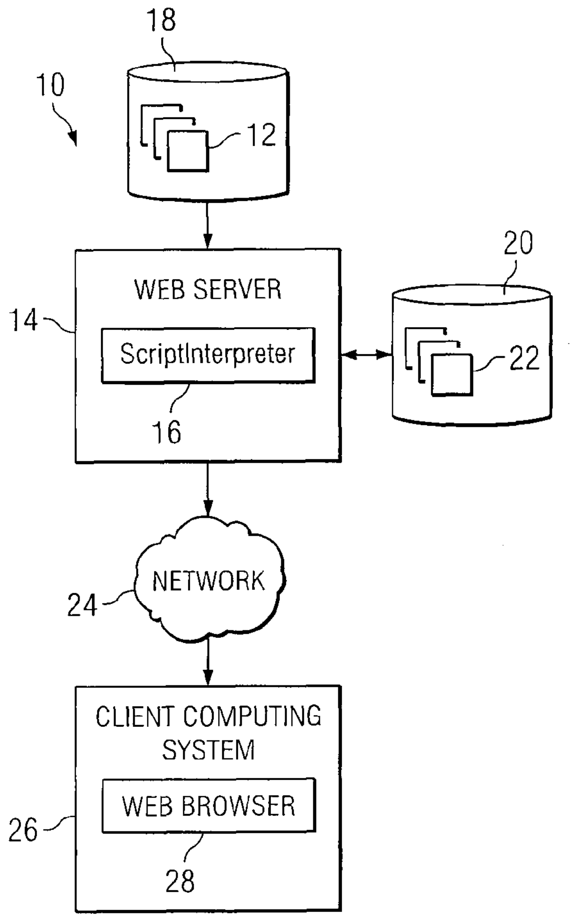
FIG. 1 is a block diagram showing several components of one embodiment of a geographical information display system according to the teachings of the present invention.

Various embodiments of the present invention may be best understood by referring to FIGS. 1 through 17 of the drawings, like reference numerals being used for like and corresponding parts of the various drawings.

The functionality and use of geographical information systems are known. The design of these systems has provided for selective viewing of various geographical regions of the surface of the Earth. Nevertheless, the design of these systems has not enabled the overlay of varying types of geo-spatially related data within a conventional web browser, such as a Firefox, Internet Explorer, or Opera type web browser. More-over, the extent of the varying types of geo-spatially related data that may be overlaid upon a viewable map has not been contemplated by these conventional systems. Therefore in one aspect of the present invention, a geographical information display system is provided that allows the display of various types of geo-spatially related data upon a map of a geographical region of the Earth using a conventional web browser.

One embodiment of a geographical information display system 10 that may enable the use of a conventional web browser is shown in FIG. 1. The geographical information display system 10 generally has an information database 18, a user store database 20, and a client computing system 26 that are coupled to a web server 14. Information database 18 may be any type of database that is accessible by the geographical information display system 10. Information database 18 may store a plurality of data records 12 having geospatially related information.

As will be described in greater detail below, geographical information display system 10 may selectively obtain particular data records 12 from information database 18 based on geo-spatial, temporal, or contextual filter criteria for display on client computing system 26. The geographical information display system 10 is operable to provide geospatially related data from information database 18 to the client computing system 26. Client computing system 26 may be any suitable computer system that is capable of displaying graphical images, such as geographical map images and other geospatially related information included in data records 12. Examples of suitable client computing systems 26 may include personal computers, laptop computers, mainframe computers, workstations, or the like.

In one embodiment client computing system 26 may be a computer system that is disposed in the console of a vehicle, such as a military aircraft or tank, and is adapted for use in navigation or reconnaissance purposes. Client computing system 26 may be coupled to the web server 14 using any suitable network 24 such as a local area network (LAN), wide area network (WAN), metropolitan are network (MAN) or other suitable communication network.

In one embodiment, client computing system 26 may communicate with the web server 14 using a client/server type model. That is, requests for data may originate from the client computing system 26 and in response, the web server 14 may respond by serving at least a portion of data records 14 requested by the client computing system 26. To this end, client computing system 26 may have a web browser 28 that is executable on the client computing system 26 and operable to issue requests and receive data in response to those requests. In one embodiment, web browser 28 may be any suitable web browser, such as a Firefox, Internet Explorer, or Opera based web browser.

Data records 12 stored in information database 18 may be served to the web browser 28 by web server 14. Web server 14 is operable to receive requests for data records from the web browser 28 and respond by transmitting at least a portion of the requested data records back to the web browser 28. The type and quantity of data records 12 transmitted to the web browser 28 may be filtered or regulated in several ways.

In one embodiment, user store database 20 may store one or more user login records 22. Each user login record 22 may correspond to a particular user of the geographical information display system 10. User login record 22 may include user access privileges to filter data records according to access privileges of its corresponding user. Information pertaining to each user of the geographical information display system 10 may be stored in the user login record 22 such that each user may only access certain types of data specified by his or her login account. In another embodiment, user login record 22 may also include information to filter data records that are transmitted to the web browser 28 based upon one or more user preferences. That is, a particular user may be privileged to receive certain types of data, but may not be desirous of receiving this data. Thus, data records 12 may be filtered against user preferences for each user. As an example, military personnel fighting on one particular battlefield may only be interested in data records 12 pertaining to that particular battlefield region. In this particular case, the user preferences that are stored in user login record 22 may be operable to filter all data records 12 that may not pertain to the battlefield of interest.

As mentioned previously, geographical information display system 10 may be operable to filter data records 12 that are transmitted to the web browser 28 based upon geo-spatial, contextual, or temporal filter criteria. In one embodiment, the geographical display system 10 may be implemented on the web browser 28 as a thin client. Certain embodiments of the present invention may provide an advantage in that periodic revisions to the executable software code may be made without undue burden on the operation of the client computing system 26. Additionally, implementation of the geographical information display system 10 as a thin client may provide for easy portability from one type of computing system to another as well as for allowing use on differing type of web browsers 28. Thus, for proper filtering of data records 12 transmitted to web browser 28, web server 14 may dynamically serve data records 12 to the web browser 28. Dynamically served data within the context of a client/server model may refer to the adaptation or modification of content transmitted to the web browser 28 based upon various criteria.

The web server 14 may include a web based application that is executable on the web server 14. In this manner, geographical information display system 10 may be implemented on client computing system 26 as a thin client. In one embodiment, web based application may be a script interpreter 16 that is operable to dynamically create geo-spatial content for the web browser 28 based upon various filtering criteria. In this particular embodiment, web server 14 may be operable to respond to a request for data records 12 by accessing a scripted file stored in user store database 20. The scripted file may be a server page, such as, for example, a java server page (JSP) or an active server page (ASP). Thus, the script interpreter 16 may combine the scripted file with any specified filtering criteria to produce a browser compatible file that is viewable by web browser 28.

Information database 18 and user store database 20 may be coupled to geographical information display system 10 using any suitable communication protocol. In one embodiment, databases 18 and 20 may be communicatively coupled to the geographical information display system 10 using any network such as those described above. In another embodiment, databases 18 and 20 may form an integral portion of web server 14 such that databases 18 and 20 and web server 14 are executable within a single computing system.

Figure 2:
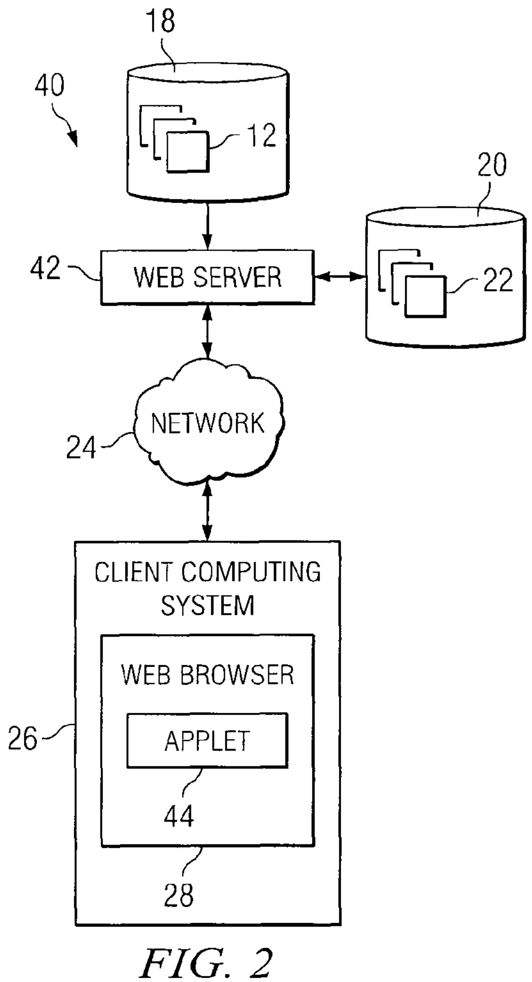
FIG. 2 is a block diagram showing several components of another embodiment of a geographical information display system according to the teachings of the present invention.

Another embodiment of a geographical information display system 40 for a geographical information system is shown in FIG. 2. The information database 18, user store database 20, client computing system 26, and web browser 28 of geographical information display system 40 of FIG. 2 are the same as in FIG. 1. Geographical information display system 40 of FIG. 2 differs however in that the web server 42 incorporates a web based application that is executable within web browser 28. In one embodiment, this web based application is an applet 44. Applet 44 may be downloaded to the web browser 28 upon initiation of each session with a user. The applet 44 may include executable code that provides for selective filtering according to user specified filtering criteria as described below. In one embodiment, applet 44 may be a java applet.

Certain embodiments of the present invention therefore may provide a web based application that allows the web browser 28 to act as a thin client. That is, a script interpreter 16 or an applet 44 may be implemented in order to allow the geographical information display system 10 to function within a conventional web browser 28. The term 'thin client' may be referred to as a particular type of client within a client/server architecture that primarily depends upon the server for processing activities. Thus, certain embodiments of the present invention may provide advantage in that maintenance and periodic upgrades of software algorithms may be easily made in the server portion of the geographical information display system 10. Additionally, reliability of the geographical information display system 10 may be enhanced by enabling the use of commercial off the shelf (COTS) software components such as commonly available web browsers.

Figure 3:
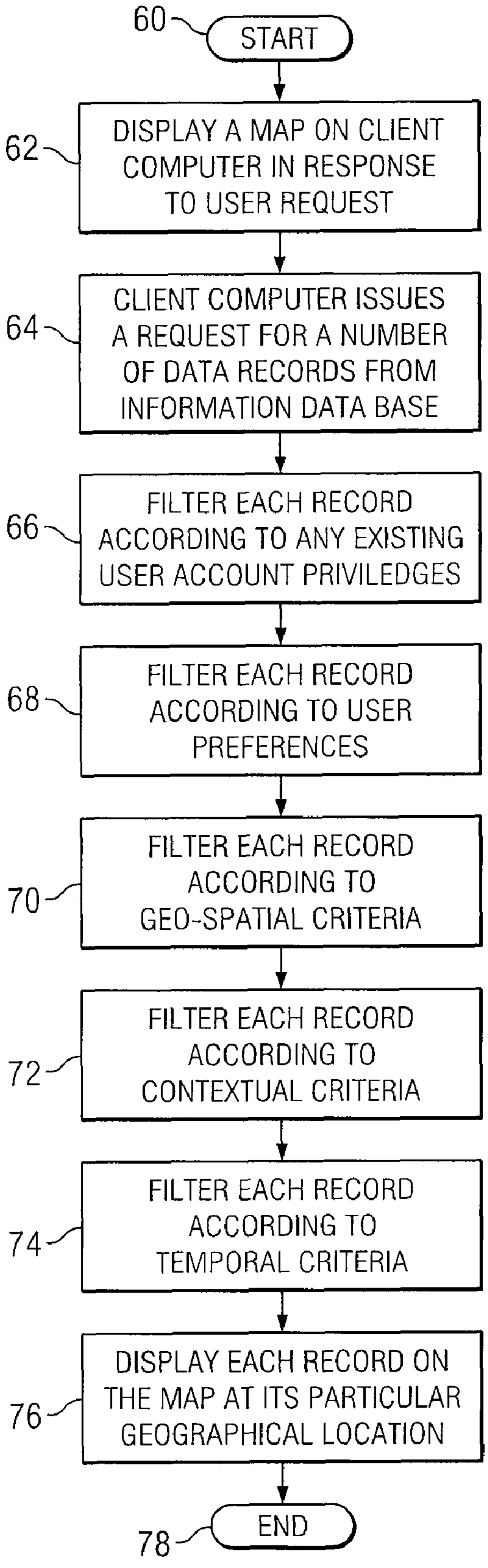
FIG. 3 is a flowchart showing a series of actions that may be taken in order to implement the embodiments of FIG. 1 or 2.

FIG. 3 shows a flowchart depicting a series of actions that may be taken by geographical information display system 10 or 40 to implement various embodiments of the present invention. In act 60, geographical information display system 10 or 40 is initiated by launching web based application 16 or 44. Web based application may be script interpreter 16 or applet 44 and may be launched by the user from the client computing system 26. In act 62, a geographical map may be displayed on the web browser 28. The geographical map may be displayed in response to a user request. The map may represent any geographical region that may be of interest to the user. For example, the user may be one or more military personnel having interest in a particular geographical region that may be, a battlefield or a region comprising a theatre of war.

In act 64, client computing system 26 may issue a request for a number of data records 12 from information database 18. This request may include one or more types of filter criteria. Each of these data records 12 may include geographical information regarding the specific location included in its respective data record 12 as well as other types of information. For example, the data record 12 may include information about current weather conditions at a particular geographical location. As another example, the data record 12 may include information regarding enemy movement during a particular military campaign. Thus, the data record 12 may include any type of information that pertains to a particular region associated with the geographical map.

In act 66, web based application 16 or 44 may filter data records 12 against any existing user account privileges. User account privileges may be obtained from user login record 22 to regulate the type of data records 12 that are transmitted to web browser 28. In a particular embodiment in which network 24 is a publicly accessible network such as the Internet, these user account privileges may be use to ensure that only valid users receive data records 12 from information database 18. The user store database 20 may be administered by any organizational entity for regulating access to data records from the geographical information display system 10 or 40. In one embodiment, the geographical information display system 10 or 40 may be administered by a military sector of the government and thus, only military personnel may be given sufficient user privileges in order to access data records from the geographical information display system 10 or 40. Additionally, the user account privileges may also regulate access to particular types of data records 12 based upon each military personnel's status or clearance.

In one embodiment, web based application 16 or 44 may filter data records 12 against any existing user preferences in act 68. For example, user preferences may include a skinnable graphical user interface (GUI) such that the look-and-feel of the image may be modified to suit the user's tastes. A skinnable graphical user interface may be referred to as a function of web based application 16 or 44 that may provide custom graphical interfaces, such as, for example, configurable color schemes or user specified selectable buttons that may enable user selection of commonly used functions on the display of client computing system 26.

Web based application 16 or 44 may be operable to filter each data record 12 according to geo-spatial criteria in act 70. To accomplish this, one or more areas of responsibility may be created on the geographical map by the user. In one embodiment, an area of responsibility (AOR) may be a particular region on the geographical map. Thus, if a particular data record 12 has a geo-spatial characteristic within the area of responsibility, this data record 12 will match the geo-spatial filter criteria and thus may be transmitted to the web browser 28. Conversely, if a particular data record 12 has location information that is not within the area of responsibility, the data record 12 will not match the geo-spatial filter criteria.

In act 72, web based application 16 or 44 filters the data records 12 based upon contextual filter criteria. Contextual filter criteria may be any type of filter criteria related to the type of information included in the data record 12. For example, filtering based upon contextual criteria may include filtering of textual data included within the data record 12 using a keyword search. Thus, data records 12 having data that matches a particular keyword will match the contextual filter criteria and thus may be transmitted to the client computing system 26 for view by the user. Further, the keyword search may also include Boolean operators, such as AND, OR, NOT, and the like type Boolean operators to further tailor the types of data records 12 that are transmitted to client computing system 26.

In act 74, web based application 16 or 44 may also filter each data record 12 based upon temporal filter criteria. That is, particular data records 12 having time-based information is within a time range specified in the temporal filter criteria. Data records 12 may each include information regarding when a particular event occurred. The web based application 16 or 44 may be operable to filter each data record 12 according to a particular time range and transmit only those data records 12 that are within that time range.

Once each data record 12 has been transmitted to the client computing system 26, it may be displayed on the display of client computing system 26 for view by the user in act 76. In one embodiment, the data record 12 may be displayed as an icon that overlays the map proximate its particular geographical location. In this manner, the user may be able to ascertain information from each data record 12 that may be pertinent to a particular geographical location. As will be described in greater detail below, the web based application 16 or 44 may allow selection of each particular icon in order to reveal details of each data record 12.

The above described actions may be performed multiple times in order to display geo-spatially related information for view by the user. The previously described method of the geographical information display system 10 or 40 continues until the web based application is stopped by the user in act 78. Thus, a geographical information display system 10 or 40 may be provided that enables the presentation of geo-spatially related information using a thin client architecture. Certain embodiments of the present invention may provide an advantage in that conventional client applications, such as a web browser may be used, thereby alleviating the inherent drawbacks of conventional geographical information systems that have been implemented using thick client architectures. For example, periodic upgrades or enhancements to the geographical information display system 10 or 40 may be performed by modification of the web based application 16 or 44 while requiring relatively little modification to the web browser 28. Thus, virtually any conventional web browser 28 may be used to implement the various embodiments of the present invention throughout the serviceable lifespan of the geographical information display system 10 or 40.

Figure 4:
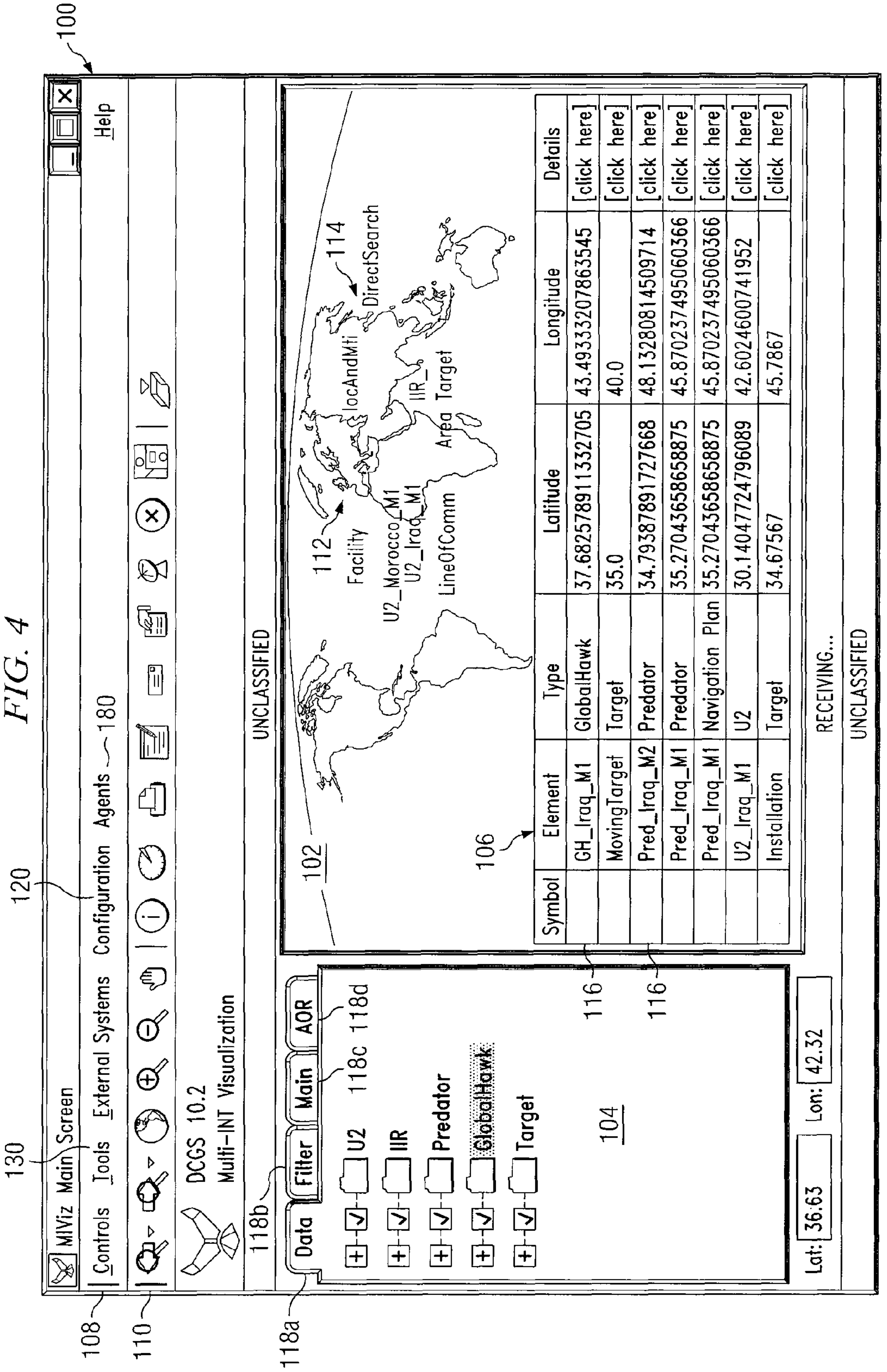
FIG. 4 shows an example main window that may be used with the embodiments of FIG. 1 or 2.

FIG. 4 shows an example main window 100 of one embodiment of the geographical information display system 10 or 40 that may be displayed upon client computing system 26. The main window 100 may be shown when the web based application 16 or 44 is initially launched by a user of the web browser 28. The main window 100 may include any number and type of window portions that enable the overlay of data records 12 in geo-spatial relation to a viewable geographical map. In the example embodiment shown, main window 100 may include a map display portion 102, a meta-frame window portion 104, a data record 12 detail portion 106, a menu bar 108, and a short-cut button region 110.

Map display portion 102 may display a geographical map that may be of interest to the user. Meta-frame window portion 104 may be included to display various filtering selections and other textual information that may be specific to the adjacently display geographical map. The menu bar 108 may be included to provide various features that may be, for example, user selection of a particular geographical region of interest, zooming in/out, specifying various user preferences, specifying an area of responsibility (AOR), and other features that will be described in detail below. The short-cut button region 110 may be provided to allow quick access to various features that are provided in the menu bar 108. Using the various features of the short-cut button region 110, specific functionality of the geographical information display system 10 or 40 may be obtained without the need for navigation through the menu bar 108.

The map display portion 102 may have one or more icons 112 that represent one or more corresponding instances of data records 12. Each data record 12 may possess information characteristic of a particular location on the map display portion 102. Each icon 112 may also include a text portion 114 indicating a summary information portion of the data record 12. In one embodiment, detailed information of each data record 12 may be provided by a data record detail portion 106. Data record detail portion 106 may have a number of rows 116, each representing one data record 12 shown on the map display portion 102. Each row 116 may have one or more columns indicating various characteristics of each data record 12 that may be, for example, the type of symbol used on the map display portion, the textual representation of each data record 12, the latitude/longitude of each data record 12, and a selectable details column. Access to a detailed information portion of the data record 12 may be provided by the details column. In this particular embodiment, selection of the detail column may cause the geographical information display system 10 or 40 to display this detailed information portion in the meta-frame window portion 104 for view by the user.

Meta-frame window portion 104 may be provided to display various types of information pertinent to the geographical region shown in the map display portion 102. In the particular embodiment shown in FIG. 4, meta-frame window portion 104 may include a number of selectable tabs, such as a 'Data' tab 118*a*, a 'Filter' tab 118*b*, a 'Map' tab 118*c*, and a 'AOR' tab 118*d*. In this particular figure, the 'Data' tab 118*a* has been selected resulting in several entries being shown. Each of these entries may be textual representations of varying categories of data records in information database 18. In another embodiment, information database 18 may be multiple information databases 18 such that each entry represents one of the information databases 18. Thus, the user may be able to interactively select from among the one or more information databases 18 for the retrieval of data records 12 particular to the geographical region displayed in the map display portion 102. The 'Filter' tab 118*b* may enable the user to select filtering criteria that will be described in greater detail below. the 'Map' tab 108*c* may enable the selection of various geographical maps that are available with geographical information display system 10 or 40.

Figure 5:
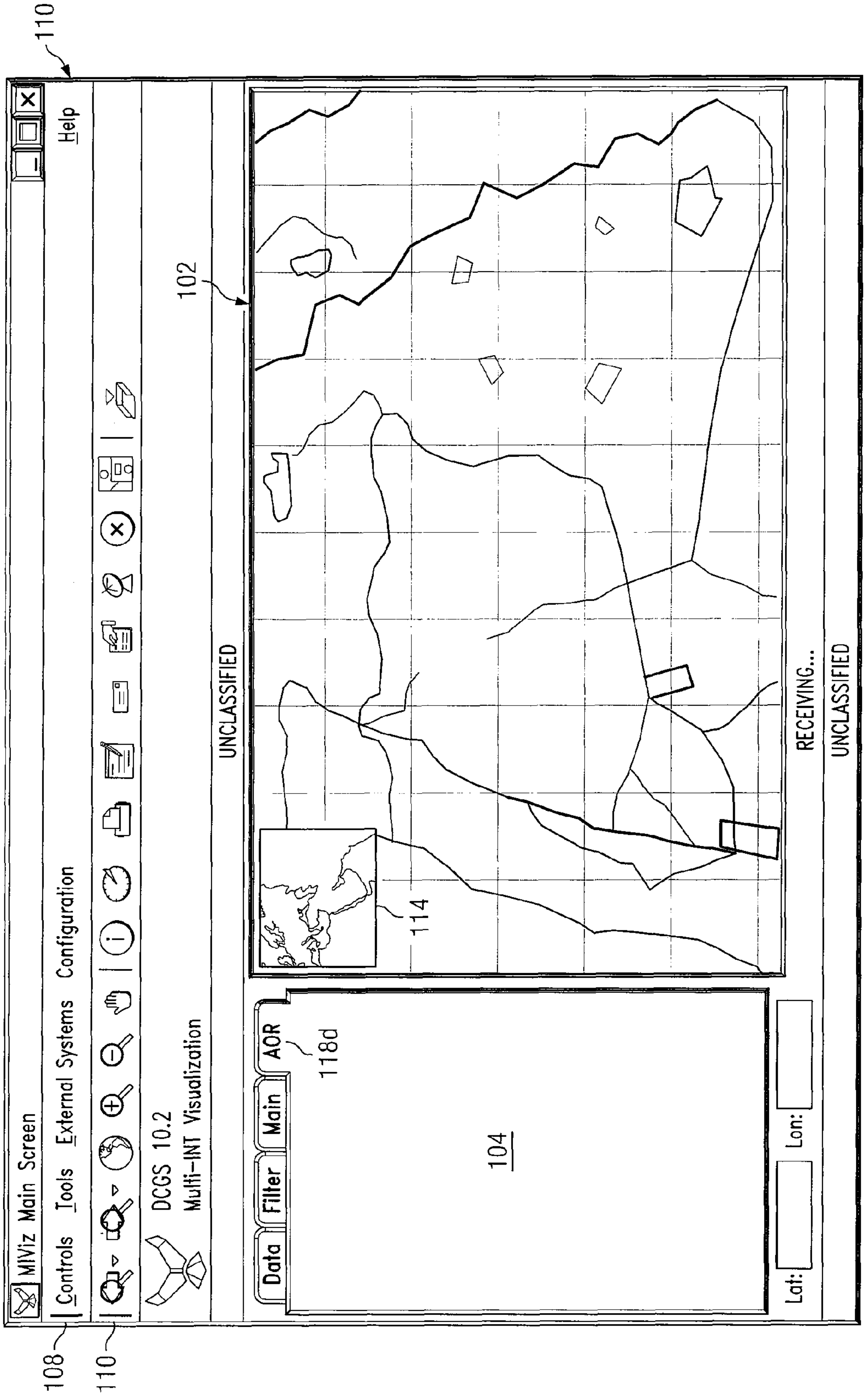
FIG. 5 shows the example window of FIG. 4 with one embodiment of an area of responsibility displayed in the map display portion.

Upon user selection of the 'AOR' tab 118*d*, a main window 110 may be displayed on the client computing system 26 as shown in FIG. 5. Meta-frame window portion 104 may include information regarding any particular areas of responsibility (AOR). An area or responsibility may be a user specified geographical region that may be of particular interest to the user. As shown in FIG. 5, a particular area of responsibility is shown in the map display portion 102 that may be a portion of the geographical region shown in the map display portion 102 of FIG. 4. In one embodiment, an overview icon 114 may be provided that allows the user to view a expanded view of the currently shown map. The expanded view may include a rastorized version of a map that covers a greater surface area and encompasses the map shown in the map display portion 102. A toggling function may be provided such that when selected by a user input device such as a mouse or a user keyboard, the expanded region may be displayed upon the map display portion 102 and map may be displayed as the icon 114. Icon 114 may function as a toggle in that subsequent selection by the user may cause map to again be displayed in the map display portion 102 and the expanded map to revert to display in the icon 114.

Figure 6:
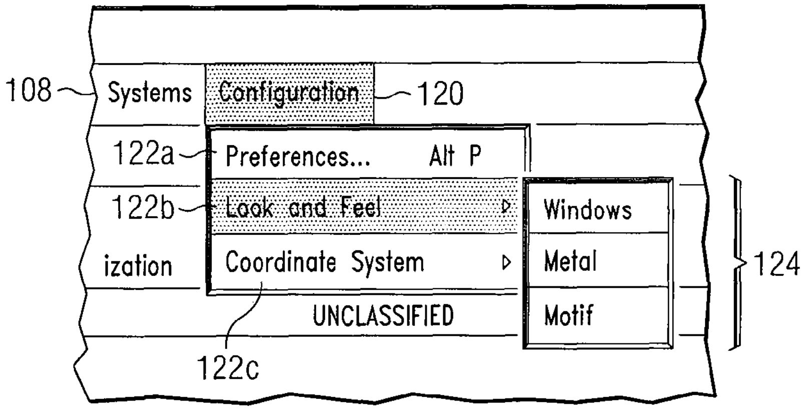
FIG. 6 shows a partial view of the main window of FIG. 4 in which a 'Configuration' button has been selected.
Figure 7:
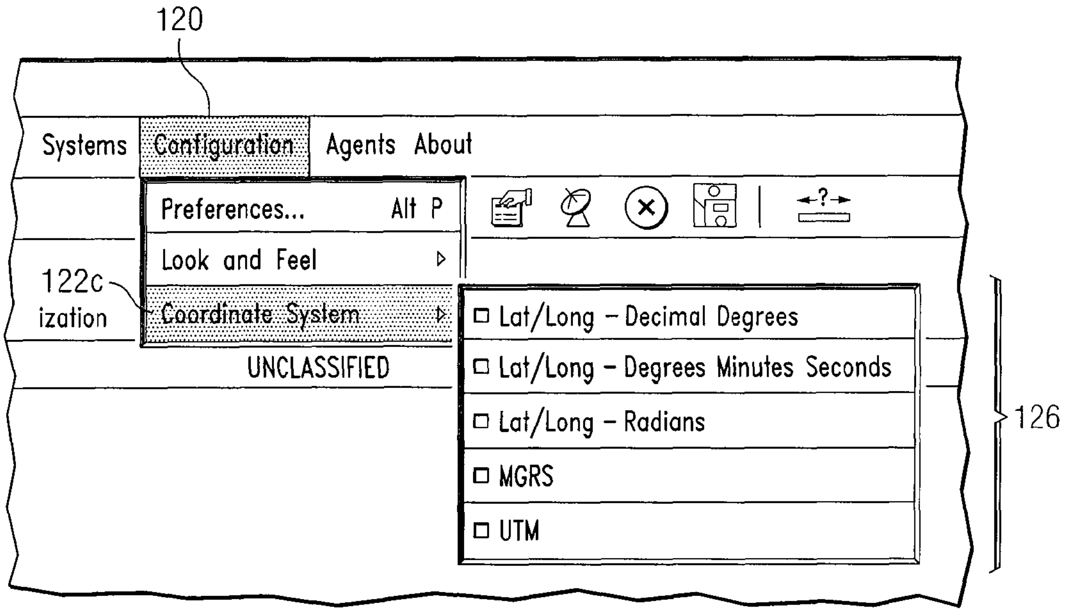
FIG. 7 shows another partial view of the main window of FIG. 4 in which a 'Configuration' button has been selected.

FIG. 6 shows an example drop-down menu that may be shown as a result of selecting the 'Configuration' button 120. The 'Configuration' button 120 in the menu bar 108 may provide for selection of various user preferences and other global parameters used by the geographical information display system 10 or 40. As shown, the 'Configuration' button 120 may include a 'Preferences' button 122*a*, a 'Look And Feel' button 122*b*, and a 'Coordinate System' button 122*c*. When the 'Look And Feel' button 122*b* is selected, other selectable buttons 124 are shown that enable the setting of prespecified user preferences for the user of the geographical information display system 10 or 40. FIG. 7 shows various differing coordinate system buttons 126 that may be shown due to selection of the 'Coordinate system' button 122*c* is selected. Selectable buttons 122 may provide for the setting of various user preferences that may be desired by the user. In one embodiment, these settings may be persistently stored in the user store database 20 such that initiation of the geographical information system 10 or 40 may automatically import these user preferences. Although only several differing types of user preferences are described for brevity and clarity of disclosure, it should be appreciated that many other types of user preferences may be persistently maintained for a particular user based upon his or her login account.

Figure 8:
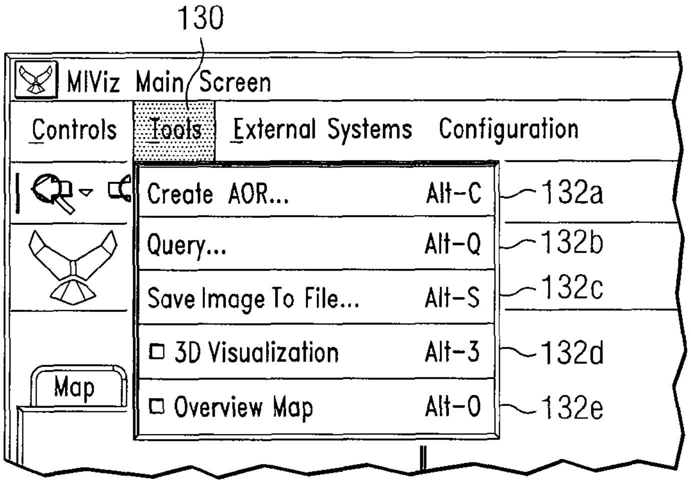
FIG. 8 shows a partial view of the main window of FIG. 4 in which a 'Tools' button has been selected.

FIG. 8 shows one embodiment of a drop-down menu that is shown as a result of selecting the 'Tools' button 130 from the menu bar 108. As shown, the drop-down menu includes a 'Create AOR' button' 132*a*, a 'Query' button 132*b*, a 'Save Image To File' button 132*c*, a '3D Visualization' button 132*d*, and an 'Overview Map' button 132*e*. Buttons 132 provide features that are provided by the various aspects of the present invention. For example, selection of the 'Save Image To File' button 132*c* may cause the web based application 16 or 44 to save the currently displayed geographical map to a file in the client computing system 26 for view at a later date. Additionally, selection of the 'Overview Map' button 132*e* may cause the web based application 16 or 44 to toggle in between map and overview map as described above.

Figure 9:
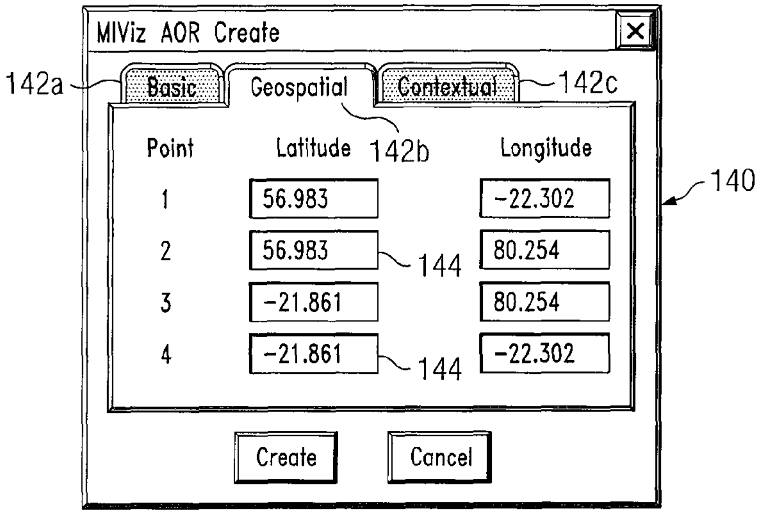
FIG. 9 shows a AOR create window that may be displayed by the system of FIG. 1 or 2 in which a 'Geospatial' tab has been selected.

An area of responsibility (AOR) may be referred to as a selectable region on the geographical map. Once created, this area of responsibility may provide a way to geo-spatially filter data records 12 that are transmitted from the web server 14. FIG. 9 shows one embodiment of a window 140 that may be displayed in response to selection of 'Create AOR' button 132*a*. Window 140 may have several selectable tabs that may be, for example, a 'Basic' tab 142*a*, a 'Geospatial'tab 142*b*, and a 'Contextual' tab 142*c*. Upon selection of the 'Geospatial' tab 142*b*, several entry boxes 144 may be displayed that allows the user to independently select particular corners of an area of responsibility using latitude and longitude coordinates. In this particular embodiment, a quantity of four coordinate points are selectable and thus, the resulting area of responsibility may conform to the shape of a quadrilateral having four vertices at each of the of the coordinate locations.

Figure 10:
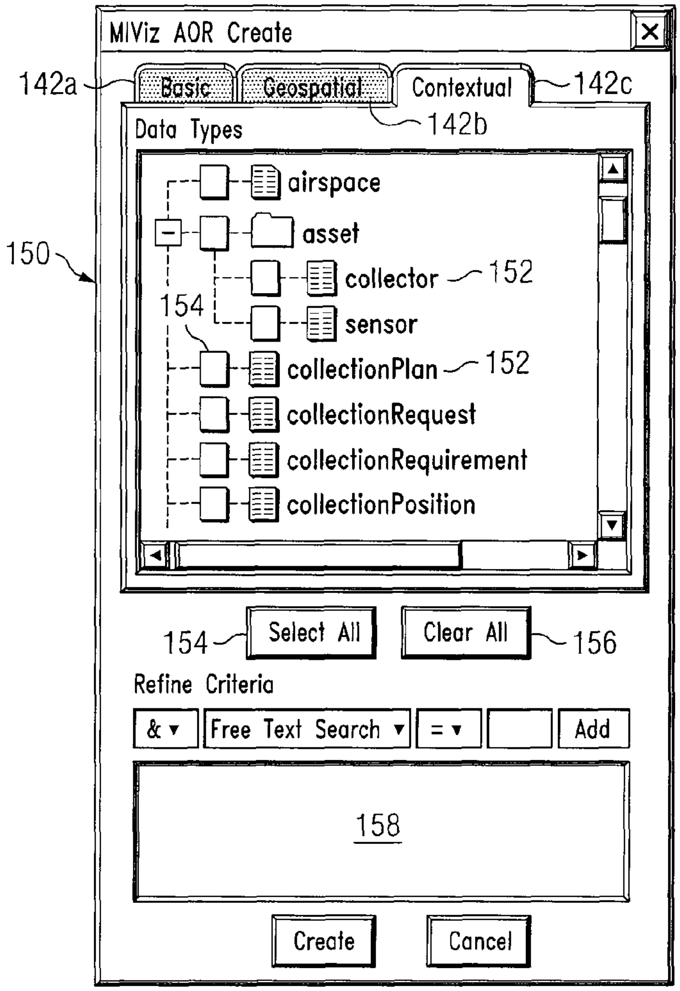
FIG. 10 shows an AOR create window of FIG. 9 in which a 'Contextual' tab has been selected.

FIG. 10 shows a window 150 that may be displayed upon selection of the 'Contextual' tab 142*c*. In this window 150, a number of database labels 152 are shown that may correspond to various information databases 18 available to the geographical information display system 10 or 40. Each of these data labels 152 may have an associated radio button 154 that may be independently selected in order to enable collection of data relevant to the area of responsibility from its particular information database 18. A 'Select All' 154 and 'Clear All' 156 buttons may also be included to select or un-select all radio buttons 154 respectively. Further filtering of data records 12 from either of the information databases 18 may be provided by a refine criteria window 158. Once a particular database label 152 is chosen, the refine criteria window 158 may provide for further refinement of data that is filtered from its respective information database 18.

Figure 11:
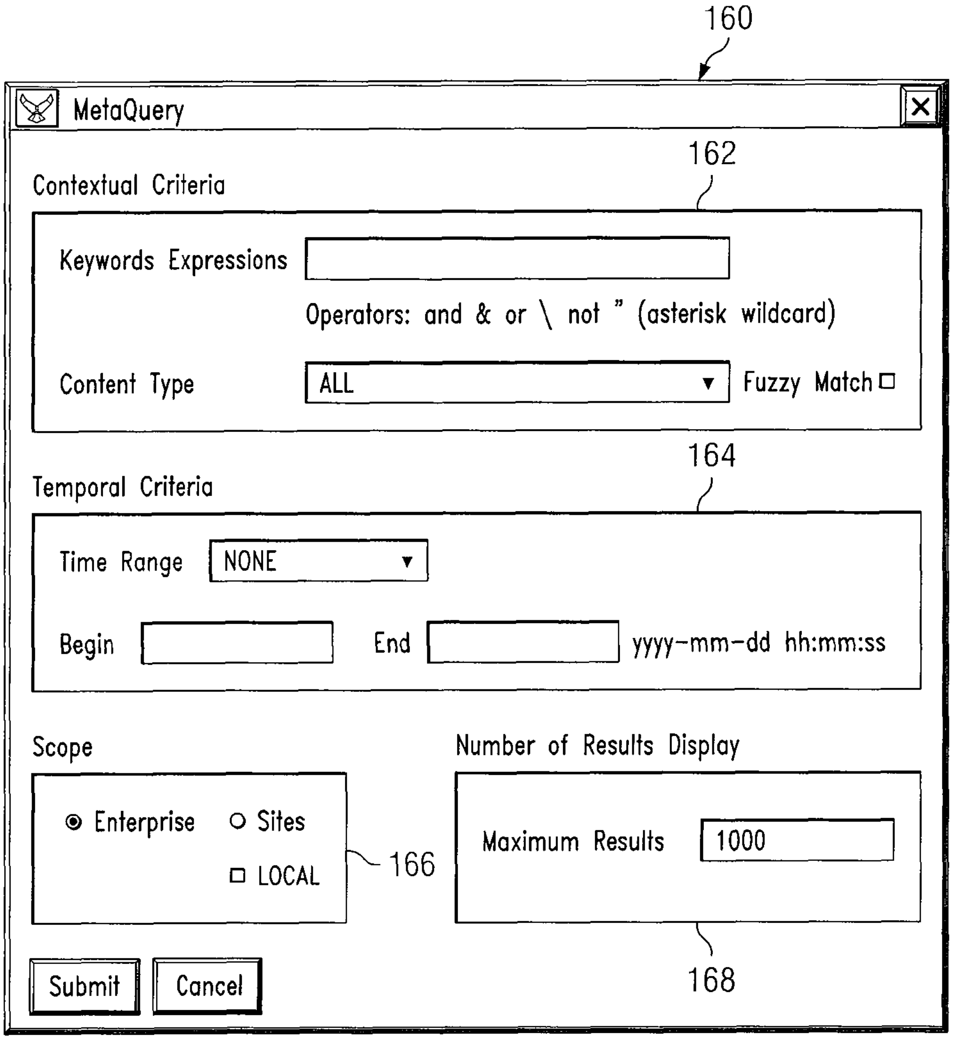
FIG. 11 shows a query window that may be used with the main window of FIG. 4.

If the 'Query' button 132*b* is selected from the 'Tools' drop-down menu button 130, a query window 160 may be displayed on the client computing system 26 as shown in FIG. 11. Query window 160 may include several selectable fields that may enable the filtering of data based upon contextual, or temporal filter criteria. Query window 160 may have a contextual criteria field 162 that may provide for the entry of alpha-numeric text by the user. Thus, the web based application 16 or 44 may be operable to filter data based upon keywords specified by the user. Additionally, Boolean operators may be provided that allows the user to perform keyword filtering based upon several Boolean operators such as AND, OR, NOT, and the like type operators. Query window 160 may also have a temporal criteria field 164 that is operable to filter data based upon a date and/or time at which the event represented by the data record 12 occurred. A particular data record 12 may have been created as a result of an event that occurred sometime in the past. For example, the event may be a radar indication of an unidentified aircraft flying over a particular location. If the creation time of this data record 12 meets the filtering requirements of the temporal criteria field 164, this particular data record 12 may match the temporal filter criteria and thus may be transmitted to the client computing system 26 for display either upon map display portion 102 or in the meta-frame window portion 104 of the main window 100. Other miscellaneous fields such as a scope field 166 or a 'Number of Results Display' field 168 may be provided. The scope field 166 may be provided to allow user selection of a range of information databases 18 to be used in the query. The 'Number of Results Display' field 168 may be provided to limit the quantity of data records 12 that are returned by the query. Thus, it may be seen that the query button 132*b* may be used to filter incoming data based upon contextual and/or temporal criteria.

Figure 12:
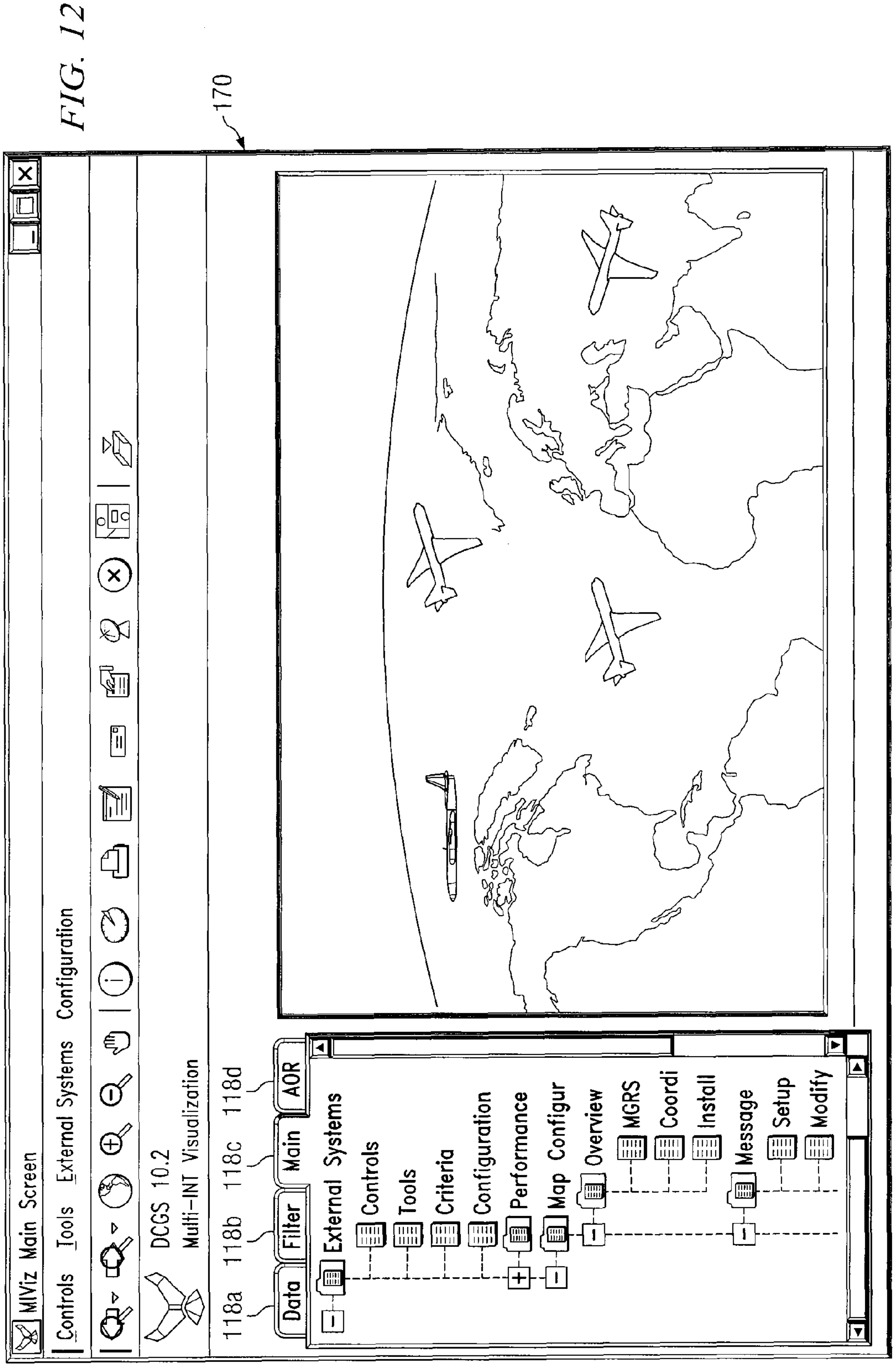
FIG. 12 shows the main window of FIG. 4 in which a three dimensional map is displayed in the map display window.

FIG. 12 shows a three dimensional map 170 that may be display in the map window 102 in response to selection of the '3D Visualization' button 132*d*. The three dimensional map 170 allows the user to view the three dimensional map 170 and associated data records 12 in a similar manner to a view that may be obtained from, for example, the windshield of an aircraft.

Figure 13:
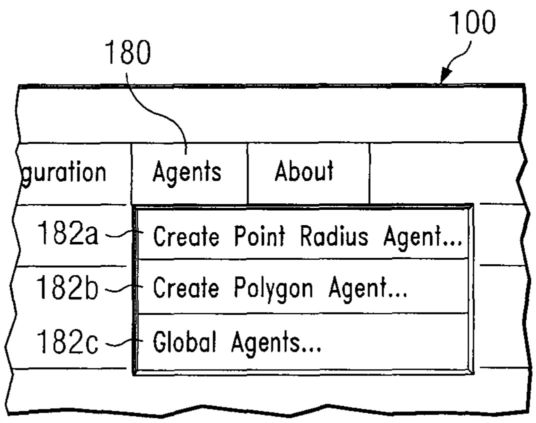
FIG. 13 shows a partial view of the main window of FIG. 4 in which the 'Agents' button has been selected.
Figure 14:
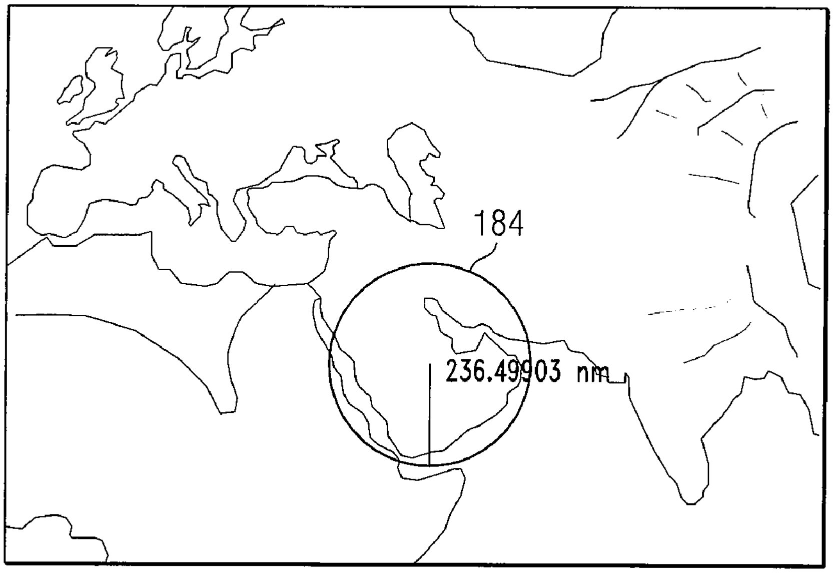
FIG. 14 shows a partial view of the map display portion in which a circular shaped geo-spatial filtering region has been selected by a user.
Figure 15:
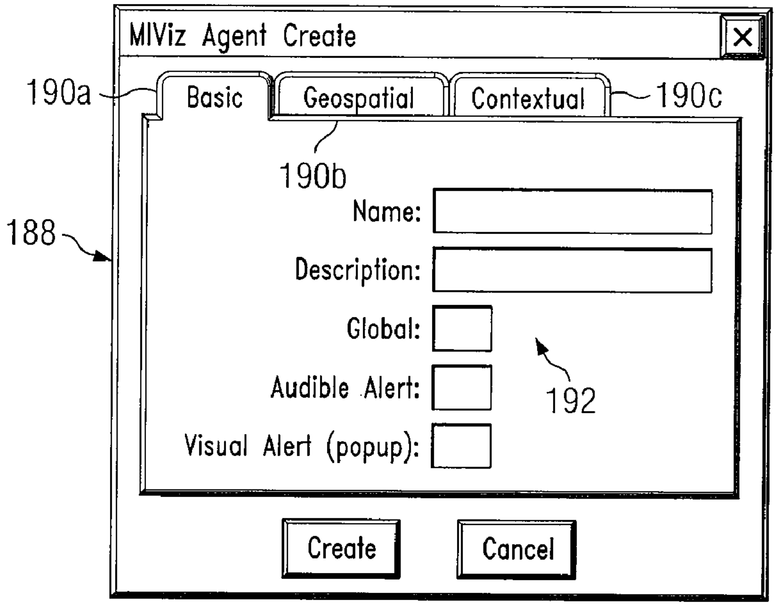
FIG. 15 shows a create agent window that may be used with the main window of FIG. 4.

As described previously, the web based application 16 or 44 provides for the filtering of data based upon temporal criteria. In one embodiment, the web based application 16 or 44 may be operable to filter data based upon data or events that were generated in the past. In another embodiment, the web based application 16 or 44 may be operable to filter data based upon data or events that are to occur in the future. The 'Agents' button 180 of the menu bar 108 may provide one way of accessing this feature. Upon selection of the 'Agents' button 180, a drop-down menu may be displayed as shown in FIG. 13. The drop-down menu may include several selectable buttons that may be a 'Create Point Radius Agent' button 182*a*, 'Create Polygon Agent' button 182*b*, and a 'Global Agents' button 182*c*. In one embodiment, the web based application 16 or 44 may be operable to create a geo-spatial filtering region that is generally circular in shape. Thus, if the 'Create Point Radius Agent' button 182*a* is selected, a geo-spatial filtering region 184 may be selected as shown in FIG. 14. In this particular embodiment, a geo-spatial filtering region 184, which in this case is generally circular in shape, has been created by a user. After geo-spatial filtering region 184 has been selected by the user, an agent window 188 may be displayed on the client computing system 26 as shown in FIG. 15. The agent window 188 may provide several selectable fields that allow the user to provide geo-spatial and/or contextual filtering to the selected geo-spatial filtering region 184. In order to provide selective input from the user, agent window 188 may have a 'Basic' tab 190*a*, a 'Geospatial' tab 190*b*, and a 'Contextual' tab 190*c* as shown in FIG. 15. In this particular example, the 'Basic' tab 190*a* has been selected for editing. Within this tab, several user fields 192 may be provided, such as a name, description, and other information pertinent to the agent's operation.

Figure 16:
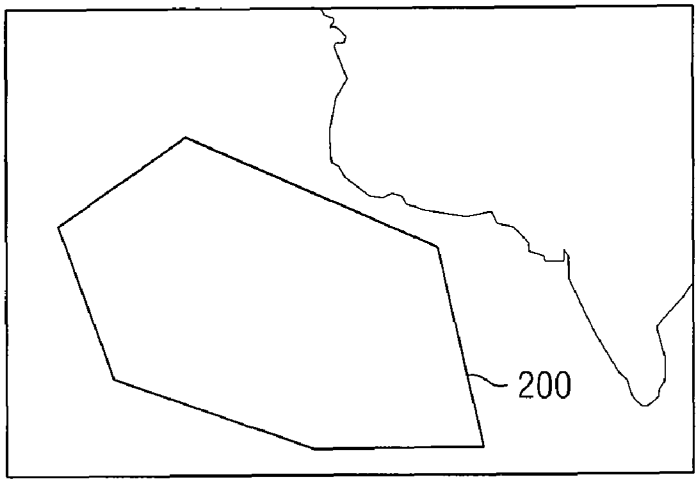
FIG. 16 shows a partial view of the map display portion in which a polygonal shaped geo-spatial filtering region has been selected by a user.

FIG. 16 shows one embodiment of another geo-spatial filtering region 200 that may be created by web based application 16 or 44. If the 'Create Polygon Agent' button 182*b* is selected, the user may be directed to create a multi-lined object on the map display portion 102 as shown in FIG. 16. This multi-lined object may serve as a boundary for the geo-spatial filtering of data records 12. This geo-spatial filtering region 200 may have any number of sides. In this manner, complex filtering of particular regions may be specified by the user for selective geo-spatial filtering of data records 12. Once the boundaries of the geo-spatial region 200 have been selected, the user may be directed to enter other pertinent criteria as shown and described with regard to FIG. 15.

Figure 17:
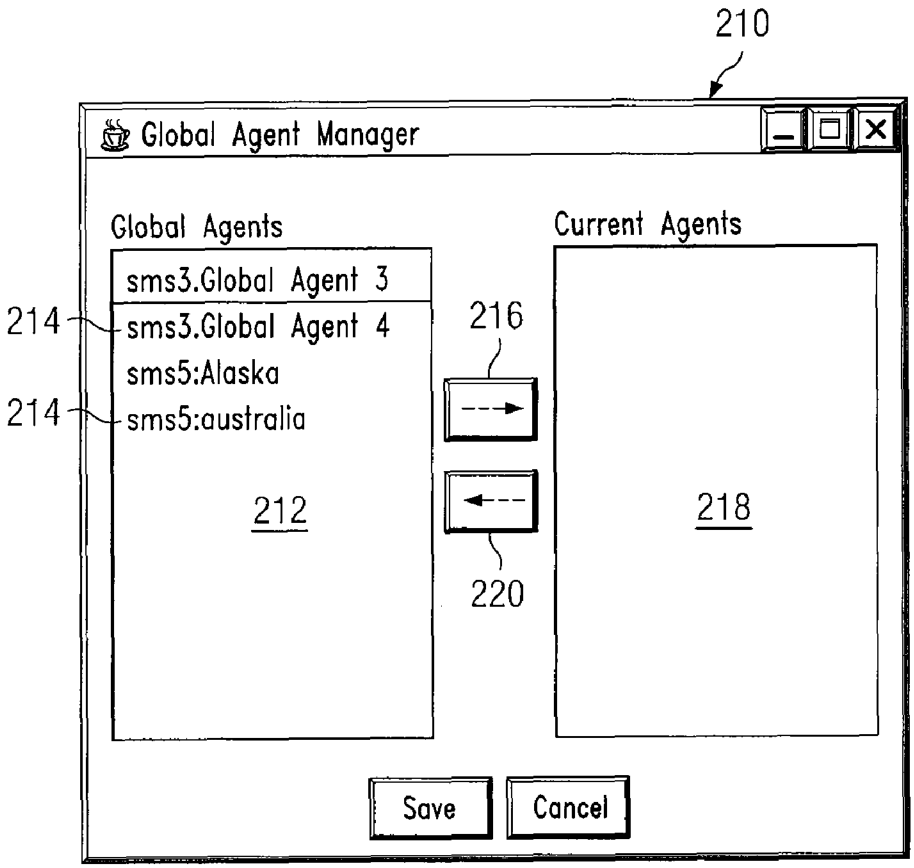
FIG. 17 shows one embodiment of a global agent manager window that may be used with the main window of FIG. 4.

In one embodiment, a global agent manager window 210 may be provided as shown in FIG. 17. The global agent manager window 210 may have a global agents window portion 212 that contains a list of one or more global agents 214. Each of these global agents 214 may be a particular geo-spatial region that is statically defined by the web based application 16 or 44. For example, global agents 214, such as 'sms5:Alaska' and 'sms5:australia' are shown that may be statically defined to cover the geographical regions of the state of Alaska and the country of Australia respectively. By selection of button 216 either of the global agents 214 may be added to a current agents window portion 218. Thus, when a particular global agent 214 is stored in the current agents window 218, a user of the web based application 16 or 44 may be continually alerted to data or events that may occur within this particular statically defined geo-spatially filtered region 214. Button 220 is also provided that allows a global agent to be removed from the current agents window portion 218. Thus, buttons 216 and 220 may be used to reciprocally add and remove statically defined global agents 214 to and from the current agents window portion 218.

Thus, a geographical information display system 10 or 40 is presented that is operable using a conventional web browser. This aspect is made possible using a web based application that allows the web browser to act as a thin client. The web based application is operable to filter requests for data records 12 from information database 18 using various filter criteria. This filter criteria may include, but not limited to, user login, user preference, contextual, temporal, or geo-spatially related filter criteria.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A geographical information system comprising:

a plurality of information databases for storage of a plurality of data records that are each associated with a particular geographical location;

a user store database for storage of a user login record associated with a user and a user preference record associated with the user;

a web server that is coupled to the information database and a client computing system, the web server being configured to retrieve the plurality of data records from the information database;

a web based application that is a script interpreter or an applet that is executable using a web browser, the web based application being operable to:

display a map on a client computing system, the map including the particular geographical location;

receive a selection of at least two information databases of the plurality of information databases;

filter the plurality of data records to identify a plurality of filtered data records, the filtering based upon:

geo-spatial, contextual, or temporal filter criteria; and the user login record and user preference record;

transmit the plurality of filtered data records from the selected information databases to the client computing system;

concurrently display a summary portion of each of the plurality of filtered data records at the particular geographical location of the map and a database name of each of the plurality of filtered data records, each respective database name comprising the name of the information database that transmitted the respective data record;

display a detailed portion of each of the plurality of filtered data records upon manual request by the user.

2. The geographical information system of claim 1, wherein the web based application is an applet.

3. The geographical information system of claim 1, wherein the web based application is a server page.

4. A geographical information system comprising:

a plurality of information databases for storage of a plurality of data records that are each associated with a particular geographical location;

a web server that is coupled to the information databases and a client computing system;

a web based application that is executable on the web server or on the client computing system using a web browser, the web based application being operable to:

display a map on the client computing system, the map including the particular geographical location;

receive a selection of at least two information databases of the plurality of information databases;

transmit at least one of the plurality of data records from each of the selected information databases to the client computing system;

concurrently display the transmitted data records at the particular geographical location of the map for a user and a database name of each of the transmitted data records, each respective database name comprising the name of the information database that transmitted the respective data record.

5. The geographical information system of claim 4, wherein the web based application is an applet.

6. The geographical information system of claim 4, wherein the web based application is a server page.

7. The geographical information system of claim 4, wherein the web based application is further operable to filter the at least one of data records based upon geo-spatial, contextual, or temporal filter criteria.

8. The geographical information system of claim 4, wherein at least one of the plurality of data records has a summary portion and a detailed portion, the summary portion being an abbreviated form of the detailed portion, the web based application being further operable to:

initially display the summary portion, and display the detailed portion upon manual request by the user.

9. The geographical information system of claim 4, further comprising a user store database that is coupled to the web server, the web based application being operable to store a user login record of the user in the user store database, and filter the at least one data record based upon the user login record.

10. The geographical information system of claim 4, further comprising a user store database that is coupled to the web server, the web based application being operable to store at least one user preference record of the user in the user store database, and filter the at least one data record based upon the user preference record.

11. The geographical information system of claim 4, wherein the web based application is further operable to set an alarm in the event that a particular type of data record is retrieved.

12. The geographical information system of claim 4, wherein the web based application is operable to display the at least one data record at the geographical location on the map in the form of an icon.

13. The geographical information system of claim 12, wherein the web based browser is further operable to display the at least one data record upon a manual input signal from the user.

14. The geographical information system of claim 13, wherein the manual input signal is provided by a mouse.

15. A computer implemented method comprising:

executing a web based application using a web browser, the web based application performing the actions of:

displaying a geographical map on a display of a client computing system;

receiving a selection of at least two information databases of a plurality of information databases;

transmitting a data record from each of the selected information databases to the client computing system, the transmitted data records being associated with a particular geographical location;

concurrently displaying the transmitted data records at the particular geographical location on the map for a user and a database name of each of the transmitted data records, each respective database name comprising the name of the information database that transmitted the respective data record.

16. The method of claim 15, wherein executing a web based application using a web browser comprises executing an applet using a web browser.

17. The method of claim 15, wherein executing a web based application using a web browser comprises executing a script interpreter on a web server using a web browser.

18. The method of claim 15, further comprising prior to transmitting a data record to the client computing system, filtering the data record based upon geo-spatial, contextual, or temporal filter criteria.

19. The method of claim 15, further comprising prior to transmitting a data record to the client computing system, filtering the data record based upon a user account privilege of the user.

20. The method of claim 15, wherein displaying the data record at the particular geographical location on the map for a user further comprises initially displaying a summary portion of the data record at the particular geographical location, and displaying a detailed portion of the data record upon manual request by the user.

* * * * *

UNITED STATES PATENT AND TRADEMARK OFFICE

CERTIFICATE OF CORRECTION

PATENT NO. : 8,290,943 B2
APPLICATION NO. : 11/773260
DATED : October 16, 2012
INVENTOR(S) : Carbone et al.

It is certified that error appears in the above-identified patent and that said Letters Patent is hereby corrected as shown below:

On the face page, in column 2, under "Other Publications", line 1, before "PCT", insert --"--, therefor On the face page, in column 2, under "Other Publications", line 2, after "PCT/US2007/073041", delete ";" and insert --,"--, therefor On page 2, in column 1, under "Other Publications", line 4, before "Intellectual", insert --"--, therefor On page 2, in column 1, under "Other Publications", line 5, after "GB0901323.6", delete ";" and insert --,"--, therefor On page 2, in column 1, under "Other Publications", line 6, before "Intellectual", insert --"--, therefor On page 2, in column 1, under "Other Publications", line 7, after "GB0901323.6", delete ";" and insert --,"--, therefor On page 2, in column 1, under "Other Publications", line 8, before "Australian", insert --"--, therefor On page 2, in column 1, under "Other Publications", line 9, after "2007272623", delete ";" and insert --,"--, therefor On page 2, in column 2, under "Other Publications", line 4, delete "Jan. 4, 2009" and insert --Jan. 14, 2009--, therefor On page 2, in column 2, under "Other Publications", line 16, after "Minoura, Toshimi, et al., "WebGD A Framework for Web-Based GIS/Database Applications", AutoCarto Proceedings Papers 2006, (2006), 1-11", insert --"Japanese Application Serial No. 2009-519617, Examiners Decision of Final Refusal mailed Aug. 14, 2012", (w/ English Translation), 11 pgs.--, therefor Signed and Sealed this
Twenty-sixth Day of February, 2013

Teresa Stanek Rea
*Acting Director of the United States Patent and Trademark Office*

In the drawings, sheet 1 of 10, fig 1, References Numeral 16, line 1, delete “ScriptInterpreter” and insert --Script Interpreter--, therefor On sheet 2 of 10, fig 3, References Numeral 66, line 3, delete “PRIVILEDGES” and insert --PRIVILEGES--, therefor On sheet 3 of 10, fig 4, References Numeral 118c, line 1, delete “Main” and insert --Map--, therefor On sheet 4 of 10, fig 5, line 6, delete “Main” and insert --Map--, therefor On sheet 8 of 10, fig 12, References Numeral 118c, line 1, delete “Main” and insert --Map--, therefor In column 3, line 39, delete “are” and insert --area--, therefor In column 5, line 55, delete “use” and insert --used--, therefor In column 7, line 29, delete “display” and insert --displayed--, therefor In column 8, line 13, delete “the” and insert --The--, therefor In column 8, line 13, delete “108” and insert --118--, therefor In column 8, line 35, after “user” and insert --,--, therefor In column 8, line 51-52, after “122c”, delete “is selected”, therefor In column 9, line 16, delete “‘Geospatial’tab” and insert --‘Geospatial’ tab--, therefor